United States Patent

[11] 3,602,043

| [72] | Inventor | Francis J. Markey<br>Lewisburg, Ohio |
|---|---|---|
| [21] | Appl. No. | 34,481 |
| [22] | Filed | May 4, 1970 |
| [45] | Patented | Aug. 31, 1971 |
| [73] | Assignee | General Motors Corporation<br>Detroit, Mich. |

[54] PEDAL TRAVEL MEASURING TOOL
7 Claims, 7 Drawing Figs.

[52] U.S. Cl. ................................................. 73/132,
73/141 AB
[51] Int. Cl. ................................................. G01l 5/32
[50] Field of Search ................................. 73/132, 141 R

[56] References Cited
UNITED STATES PATENTS

| 1,760,602 | 5/1930 | McKinney et al. | 73/132 |
| 1,883,154 | 10/1932 | Watrous | 73/132 X |

*Primary Examiner*—Jerry W. Myracle
*Attorneys*—W. E. Finken and D. D. McGraw

ABSTRACT: A brake system inspection tool which measures the travel of the brake pedal upon application of a specified pedal force. The tool is clamped to the brake pedal and as brake applying force is applied a scale indicates the travel of the pedal. A force indicating assembly signals the test operator when the specified force has been applied.

INVENTOR
Francis J. Markey
BY
D.D. McGraw
ATTORNEY

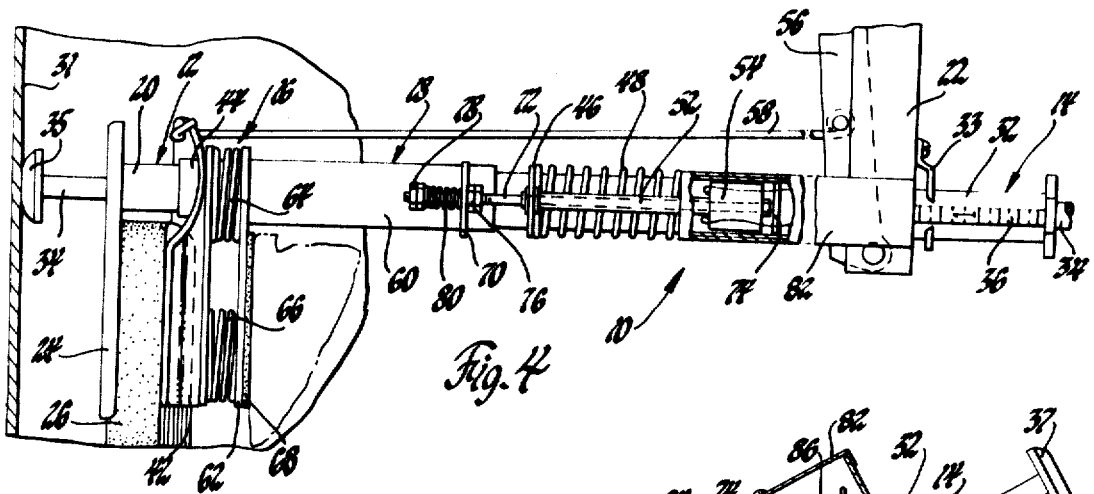
Fig. 4
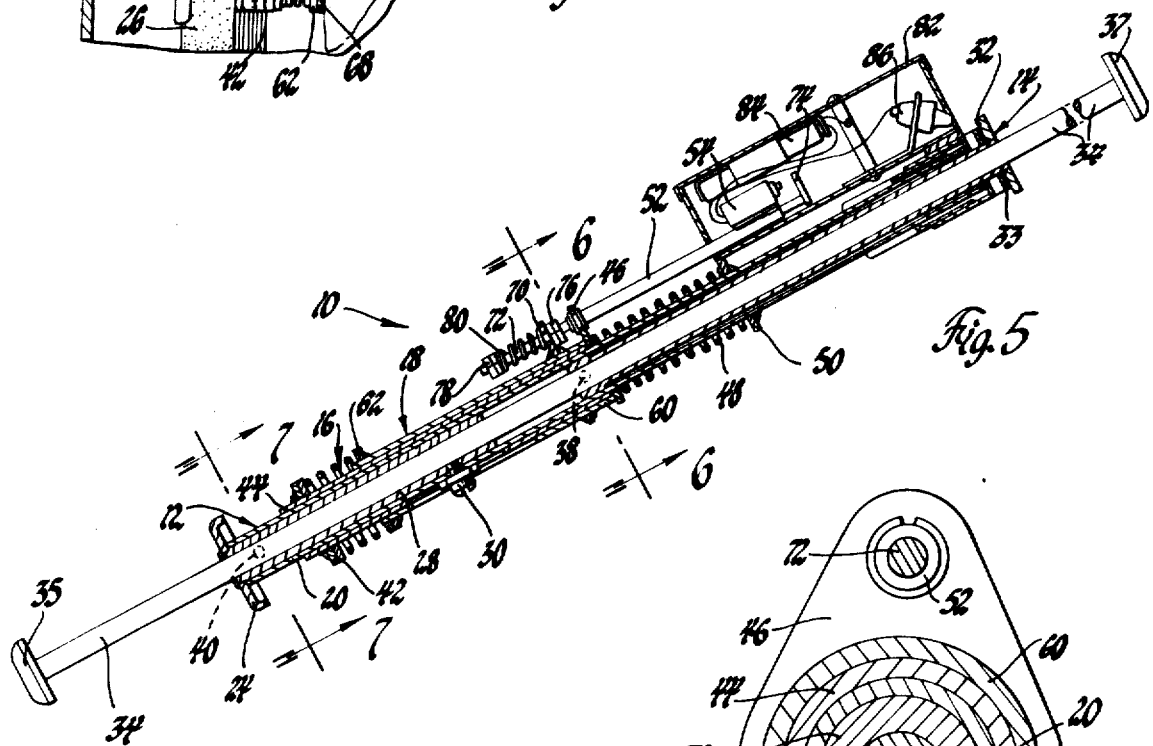
Fig. 5
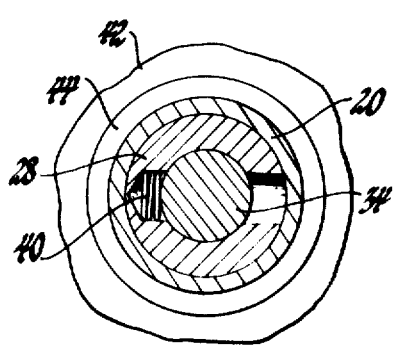
Fig. 7
Fig. 6
INVENTOR
Francis J. Markey
BY
D. D. McGraw
ATTORNEY

PEDAL TRAVEL MEASURING TOOL

The invention relates to a mechanism for inspecting motor vehicle pedal actuated systems, and more particularly pedal actuated brake systems. It is known that such brake system problems as brake fluid leaks and air entrapment are evidenced by an excessive amount of pedal travel upon brake application by the vehicle operator. One method of verifying the operational integrity of the vehicle brake system is to determine the limits of brake pedal travel corresponding to a properly functioning system and to inspect the vehicle brake system for conformance to these standards. It is desirable therefore to provide a brake pedal travel measuring tool which will provide for the application of a specified force against the brake pedal and measure the displacement of the brake pedal from its initial rest position to its terminal position at the specified pedal force. The tool may also be used for inspecting other pedal actuated systems having similar parameters. However, further description of the tool will be related to a vehicle brake system.

The present invention comprises a portable, manually operable brake pedal travel measuring tool including a frame assembly, a clamping assembly, a travel indicating assembly, and a force indicating assembly. The clamping assembly is constructed about a tubular member which is axially slidable on the frame assembly. An upper jaw mounted on the clamping assembly is aligned with a lower jaw mounted on the frame assembly. A clamping spring urges the upper jaw against the lower jaw. Actuation of a hand lever mounted on the frame assembly overcomes the clamping spring, separating the upper and lower jaws so that they can be located on opposing sides of the brake pedal. Upon release of the hand lever, the clamping spring urges the upper jaw toward the lower jaw, thereby securely clamping the tool assembly to the pedal.

The travel indicating assembly is axially slidable in the bore of the frame assembly and includes a rod of sufficient length to engage the vehicle floor and a tube upon which a linear displacement scale is marked. The operator slides the rod into the frame assembly until it engages the vehicle floor. The scale tube is then pushed into the frame assembly so that it indicates zero travel. Upon application of brake actuating force, the rod and scale tube remain stationary while the other elements of the tool advance as the brake pedal rotates about its pivot point. The travel of the brake pedal is indicated on the scale as the tool advances in relation to the stationary scale.

The force indicating assembly provides a means of indicating to the operator that the proper test force has been applied and that the scale should be read. A foot plate attached to a tubular member which is slidable on the clamping assembly tubular member seats compression springs which engage the upper jaw of the clamping assembly. Force applied to the foot plate by the operator causes the springs to compress as the application of the brakes requires increasing force. As the springs compress, a rod attached to the slidable tubular member of the force indicating assembly moves relative to a switch mounted on the clamping assembly. The rod is adjusted so that the travel necessary to actuate the switch corresponds to the compression of the springs at the specified test force.

An enclosure mounted on the frame assembly houses a signal lamp and a source of electric current. Upon actuation of the switch by the force indicating assembly, the circuit is completed and the lamp signals the operator to terminate the application of force and read the scale. Mechanical, hydraulic, or other electrical signal means could be alternatively provided to indicate the application of the specified force.

In the drawings:

FIG. 4 is a plan showing the brake pedal travel measuring tool of FIG. 2 in its fully applied position;

FIG. 5 is a sectional view of the brake pedal travel measuring tool of FIG. 2 showing the internal construction of the device;

FIG. 6 is a cross-sectional view of the brake travel measuring tool of FIG. 5 showing the friction detent between telescoping members; and FIG. 7 is a cross-sectional view of the brake pedal travel measuring tool of FIG. 5 showing the friction detent between other telescoping members.

Figure 1:
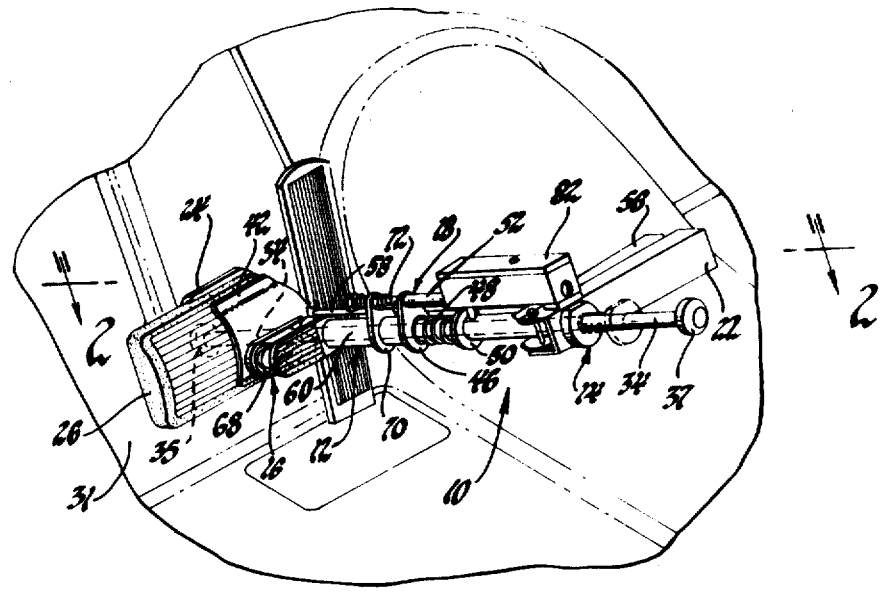
FIG. 1 is a cutaway view of a vehicle showing the brake pedal travel measuring tool clamped to the brake pedal and ready for operation.

The brake pedal travel measuring tool 10 includes a frame assembly 12, a travel indicating assembly 14, a clamping assembly 16, and a force indicating assembly 18. The frame assembly 12 includes tubular frame member 20, handle 22, lower jaw 24, bushing 28, and screw 30. The tubular frame member 20 serves as the chassis member of the device. Handle 22 is attached to the upper end of the tubular frame member 20. Lower jaw 24 is shaped to conform to the back side of the brake pedal 26 and is mounted on bushing 28 which is inserted into the lower end of tubular frame member 20 and attached by screw 30.

The travel indicating assembly 14 includes scale tube 32, rod 34, spring 38, and spring 40. Scale tube 32 telescopes into frame member 20. Rod 34 extends out both ends of tubular frame member 20 and is slidable at its upper end section through the bore of scale tube 32 and at its lower end section through the bore of bushing 28. Rod 34 is of sufficient length to reach the vehicle floor 31 in any of the various vehicles in which the tool may be used. A chordal segment of the periphery of the scale tube 32 is removed along its length to provide a flat surface on which scale 36 is marked. Scale index 33 is attached to tubular frame member and indicates the reading on scale 36. Spring 38 is inserted into a hole drilled in scale tube 32 to form a friction detent which frictionally engages the rod 34 to the scale tube 32. Spring 40 is inserted in a hole drilled in bushing 28 to form a friction detent which frictionally engages the rod 34 to the bushing 28. Knobs 35 and 37 are attached to the ends of rod 34.

A clamping assembly including upper jaw 42, clamping tube 44, switch mounting tube support 46, clamping spring 48, hand lever 56, and clamping rod 58 clamps the tool to the brake pedal. Upper jaw 42 is mounted on the lower end of clamping tube 44 which is axially slidable on tubular frame member 20. Screw 30 engages a slot in clamping tube 44 allowing the clamping tube to move axially in relation to tubular frame member 20, but maintaining the alignment of the upper jaw 42 and the lower jaw 24. Clamping spring 48 is seated against spring seat 50 attached to the tubular frame member 20 and acts against switch mounting tube support 46 to urge upper jaw 42 towards lower jaw 24. Hand lever 56 is pivotally attached to handle 22 and is connected by rod 58 to upper jaw 42. Force applied to the hand lever 56 overcomes the clamping spring 48 and thereby moves upper jaw 42 away from lower jaw 24.

Force indicating assembly 18 includes switch actuating tube 60, foot plate 62, calibrated springs 64 and 66, rubber pad 68, switch mounting tube 52, microswitch 54, switch rod support 70, switch actuating rod 72, switch actuating plate 74, adjuster nut 76, nut 78, and spring 80. Switch actuating tube 60 is axially slidable on the outside of clamping tube 44. Screw 30 engages a slot in the switch actuating tube 60 allowing the switch actuating tube 60 to move axially but not rotatably. Foot plate 62 is attached to the lower end of the switch actuating tube 60 in alignment with upper jaw 42 and seats calibrated springs 64 and 66 which engage lower jaw 24. Rubber pad 68 is attached to the upper face of the foot plate 62. The lower end of switch mounting tube 52 is attached to switch mounting tube support 46. Microswitch 54 is mounted on the upper end of switch mounting tube 52. Switch rod support 70 is mounted on the switch actuating tube 60. Switch actuating rod 72 is axially slidable through the coaxial hole in the switch rod support 70 and the bore of switch mounting tube 52. Switch actuating plate 74 is attached to the upper end of switch actuating rod 72 and is arranged to actuate microswitch 54 upon appropriate movement of the switch actuating rod 72. The lower end of switch actuating rod 72 is threaded to receive adjuster nut 76 located between switch mounting tube support 52 and switch actuating rod support 70, and nut 78 located at the end of the switch actuating rod 72. Nut 78 forms a seat for spring 80 which acts against the switch rod support 70 to bias the switch actuating rod 72 in the switch actuating direction.

Switch housing 82 is attached to the upper end of tubular frame member 20. Switch mounting tube 52 extends through a hole in the switch housing 82. Battery 84 and lamp 86 are mounted in switch housing 82. The lamp 86 is mounted so as to shine through a hole in the switch housing 82 and illuminate the scale tube 32. Electric conductors are provided to conduct current from the battery 84 to the lamp 86 upon actuation of the microswitch 54.

OPERATION

Figure 2:
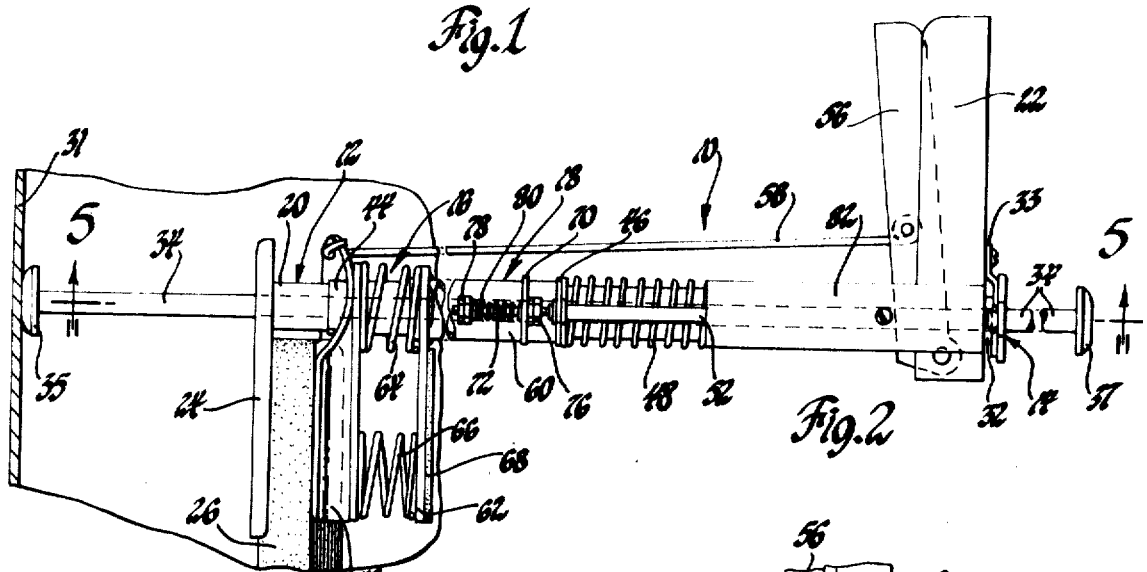
FIG. 2 is a section through the vehicle showing the brake pedal travel measuring tool of FIG. 1 clamped to the brake pedal and ready for operation.
Figure 3:
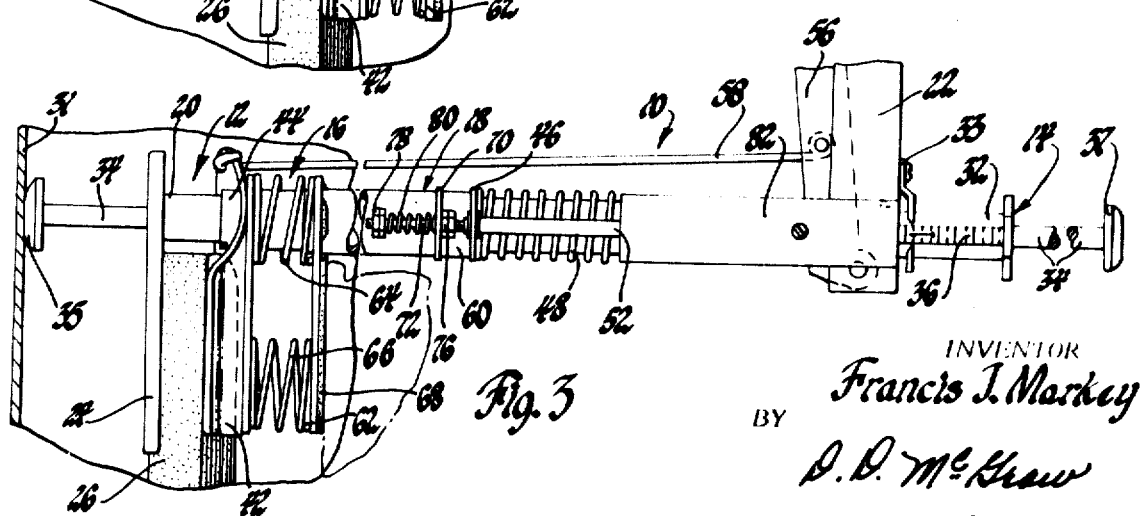
FIG. 3 is a plan view showing the brake pedal travel measuring tool of FIG. 2 after sufficient force has been applied to take up the free travel of the brake system.

The tool operator enters the vehicle with the brake pedal travel measuring tool and by applying pressure to hand lever 56 causes the clamp assembly 16 and the force indicating assembly 18 to move axially on the frame assembly 12, moving upper jaw 42 away from lower jaw 24. The tool assembly is then maneuvered so that the lower jaw 24 and the upper jaw 42 are on opposing sides of the brake pedal 26. Hand lever 56 is then released and clamping spring 48 acts to urge the clamping assembly 16 to its rest position with the brake pedal 26 securely clamped between the lower jaw 24 and the upper jaw 42. Rod 34 is then pushed into the tool assembly so that the knob 35 abuts the vehicle floor. The scale tube 32 is pushed into the tubular frame member 20 until it abuts the scale pointer 33 to provide a zero travel indicator. FIG. 1 and FIG. 2 show the brake pedal travel measuring tool clamped to the pedal with the rod 34 pushed against the vehicle floor and the scale tube 34 pushed into the tubular frame member 20. The operator then applies pressure against the foot plate 62 with his foot. FIG. 3 shows the tool after the operator has applied the small amount of force necessary to take up the slack in the brake apply system and engage the brakes. As the brake pedal 26 travels in its arcuate path about its pivot point, scale tube 32, which is frictionally engaged on rod 34, and rod 34 remain stationary while the other elements of the brake pedal travel measuring tool move axially downwardly in relation to the stationary rod 34. At this point in the operation of the tool the scale index 33 indicates on the scale 36 the amount of the free pedal travel in the brake system. The operator continues to apply force to the foot plate 62 compressing calibrated springs 64 and 66. As the calibrated springs 64 and 66 compress, force indicating assembly 60 moves axially downward in relation to frame assembly 12 and clamping assembly 16. As the switch actuating tube 60 travels downward in relation to clamping assembly 16, it carries the switch actuating plate 74 into actuating engagement with microswitch 54 mounted on the clamping assembly 16. The actuation of the microswitch 54 completes the circuit between battery 84 and lamp 86, signaling the operator that the specified test force has been applied. At this point the tool, as shown in FIG. 4, displays on scale tube 32 the total pedal travel encountered during application of the brake system to the specified force. The operator then reads the scale and compares the measured travel with the manufacturer's specification for that brake system.

If the operator continues to apply force after the switch actuating plate 74 has engaged the microswitch 54, the spring 80 compresses allowing the switch actuating tube 52 to move without damaging the microswitch 54. After completing the test, force is applied to the hand lever 56, moving clamp assembly 16 upward in relation to the frame assembly 12 and thereby separating lower jaw 24 and upper jaw 42. The tool is then removed from the vehicle.

The tool can easily be calibrated to provide the specified force. Frame assembly 12 is held stationary while the specified force is applied to the foot plate 56 by means of a scale or a measured weight. The adjuster nut 76 is then turned to move the switch actuating rod 72 until switch actuating plate 74 engages microswitch 54.

Thus a portable, manually operable brake pedal travel measuring tool is provided which is quickly and easily installed, utilized to obtain an accurate measurement and removed. It combines speed and accuracy with simplicity of operation.

What is claimed is:
1. A vehicle brake pedal travel measuring tool comprising
a frame assembly including a lower jaw attached thereto and having a scale index;
a clamping assembly being mounted on and axially slidable in relation to said frame assembly and including an upper jaw attached thereto;
means biasing said upper jaw against said lower jaw to clamp said brake pedal travel measuring tool to a vehicle brake pedal;
a travel indicating assembly having a scale marked thereon, and being mounted on and axially slidable in relation to said frame assembly to abut the vehicle floor, whereupon brake applying movement of the brake pedal and frame assembly clamped thereto, said travel indicating assembly remains stationary, said scale index indicating on said scale the travel of the brake pedal;
and force indicating assembly including signal means and force sensitive means for actuating said signal means at a predetermined force level, said force indicating assembly being mounted on and axially slidable in relation to said clamping assembly, the application of a specified braking force to said force indicating assembly being sensed by said force sensitive means to actuate said signal means to signal the tool operator to terminate the application of braking force and to read the pedal travel scale.
2. The brake pedal travel measuring tool of claim 1, said frame assembly further including:
a tubular frame member;
a bushing having an axially extending bore therethrough and being inserted in the lower end of said tubular frame member;
said lower jaw shaped to abut the back side of the vehicle brake pedal and attached to the lower end of said bushing;
and means attaching said bushing to said tubular frame member.
3. The brake pedal travel measuring tool of claim 1, said clamping assembly further including:
a screw engaged in said frame assembly and having a head extending radially outward from said frame assembly;
a clamping tube axially slidable in relation to said frame assembly and having a longitudinally extending slot formed engaging said screw to prevent rotary motion of said clamping tube in relation to said frame assembly;
said upper jaw shaped to fit the face of the vehicle brake pedal and attached to the lower end of said clamping tube in radial alignment with said lower jaw;
a handle attached to the upper end of said frame assembly;
a hand lever pivotally mounted on said handle;
and a clamping rod pivotally connected to said hand lever and said upper jaw, whereupon application of force to said hand lever said upper jaw is moved away from said lower jaw against the force exerted by said biasing means.
4. The brake pedal travel measuring tool of claim 1, said biasing means further including:
a switch mounting tube support attached to the upper end of said clamping assembly;
a spring seat attached to said frame assembly;
said spring means seated at said spring seat and acting against said switch mounting tube support to bias said upper jaw toward said lower jaw to clamp said brake pedal travel measuring tool to said vehicle brake pedal.
5. The brake pedal travel measuring tool of claim 1, said travel indicating assembly further including:

a scale tube axially slidable in a bore formed through said frame assembly, said scale tube having an axially extending bore therethrough, said scale being marked along the length of said scale tube on its outer surface, a shoulder of said scale tube abutting said scale index to limit the travel of said scale tube into said frame assembly;

a rod axially slidable through the bores of said scale tube and said frame assembly, said rod extending outward from both ends of said frame assembly and of sufficient length to be extended to engage the vehicle floor when said tool assembly is clamped to the brake pedal;

a knob attached to each end of said rod;

first spring means seated in a radially extending cavity formed in the wall of said scale tube and engaging said rod to form a friction detent between said scale tube and said rod;

and second spring means seated in a radially extending cavity formed in the wall of said frame assembly and engaging said rod to form a friction detent between said rod and said frame assembly;

whereupon brake applying movement of the brake pedal and the frame assembly clamped thereto, said travel indicating assembly remains stationary, said scale index indicating on said scale the travel of said brake pedal.

6. The brake pedal travel measuring tool of claim 1, said force sensitive means further including:

a screw engaged in said frame assembly and having a head extending radially outward from said frame assembly;

a switch actuating tube mounted on and axially slidable in relation to said clamping assembly and having a longitudinally extending slot formed therein engaging said screw to prevent rotary movement of said switch actuating tube;

a foot plate attached to said switch actuating tube at its lower end, and having a rubber pad attached thereto, said foot plate providing a surface upon which the tool operator places his foot to apply brake actuating force;

and spring means seated between said foot plate and said upper jaw, whereupon application of braking force to said foot plate said spring means is compressed in proportion to braking force applied thereby causing said force indicating assembly to move relative to said clamping assembly.

7. The brake pedal travel measuring tool of claim 1, said signal means further including:

a switch mounting tube support attached to said clamping assembly;

a switch mounting tube attached at its lower end to said switch mounting tube support;

a microswitch mounted on the upper end of said switch mounting tube;

a switch actuating rod support attached to said force sensitive means and having formed therein a hole in axial alignment with the bore of said switch mounting tube;

a switch actuating rod extending through the hole in said switch actuating rod support and through the bore of said switch mounting tube and slidable therein, said switch actuating rod having a switch actuating plate attached to the upper end thereof and having the lower end threaded;

spring means seated against said switch actuating rod support and acting against a nut engaging the threads of said switch actuating rod to urge said switch actuating rod in a switch actuating direction, said spring means being compressible following switch actuation to prevent damage to said microswitch upon continued movement of said force sensitive means relative to said clamping assembly;

an adjusting nut engaging the threaded portion of said switch actuating rod intermediate said switch mounting tube support and said switch actuating rod support, said nut being urged by said spring means into abutment of said switch actuating rod support thereby limiting the travel of said switch actuating rod in a switch actuating direction; said nut being positioned to provide a space between said switch actuating plate and said microswitch equal to the travel of said force indicating assembly relative to said clamping assembly upon application of the specified braking force, whereby upon application of the specified force to said force indicating assembly, said force sensitive means carries said switch actuating plate into actuating engagement of said microswitch;

a battery providing a source of electrical energy;

a lamp connected by suitable electrical conductors with said microswitch and said battery, whereby upon actuation of said microswitch said scale is illuminated by said lamp signalling the test operator to terminate the application of braking force and to read the scale;

and a switch housing mounted on the upper end of said frame assembly and enclosing said microswitch, said battery, and said lamp, said switch housing having a hole therein through which said lamp shines.

PO-1050
(5/69)

UNITED STATES PATENT OFFICE
CERTIFICATE OF CORRECTION

Patent No. 3,602,043      Dated August 31, 1971

Inventor(s)     Francis J. Markey

It is certified that error appears in the above-identified patent and that said Letters Patent are hereby corrected as shown below:

Column 2, line 4, "plan showing" should read -- plan view showing --. Column 3, line 37, "indicator" should read -- indication --. Column 4, line 54, "engaging" should read -- therein engaging --; line 70 "said spring means" should read -- and spring means --.

Signed and sealed this 13th day of June 1972.

SEAL)
ttest:

DWARD M. FLETCHER, JR.            ROBERT GOTTSCHALK
ttesting Officer                     Commissioner of Patents